(12) United States Patent
Mitchell

(10) Patent No.: US 7,532,455 B2
(45) Date of Patent: May 12, 2009

(54) ENERGY STORAGE DEVICE HAVING A SEPARATOR BLOCKING PARASITIC IONS

(75) Inventor: Porter Mitchell, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 364 days.

(21) Appl. No.: 11/279,788

(22) Filed: Apr. 14, 2006

(65) Prior Publication Data

US 2007/0242415 A1    Oct. 18, 2007

(51) Int. Cl.
*H01G 9/00* (2006.01)

(52) U.S. Cl. .............. 361/502; 361/503; 361/504; 361/508; 361/512; 361/523

(58) Field of Classification Search .......... 361/502, 361/503–504, 508–512, 516–519, 523–525, 361/528–534
See application file for complete search history.

(56) References Cited

U.S. PATENT DOCUMENTS

| | | | |
|---|---|---|---|
| 5,010,181 A | | 4/1991 | Coughlin |
| 5,057,972 A | * | 10/1991 | Ishii .......................... 361/512 |
| 5,695,887 A | | 12/1997 | Amatucci |
| 5,824,434 A | | 10/1998 | Kawakami |
| 6,042,740 A | * | 3/2000 | Uehara et al. .............. 252/62.2 |
| 6,275,371 B1 | * | 8/2001 | Yoshio et al. ............... 361/502 |
| 6,285,543 B1 | * | 9/2001 | Komatsu et al. ............ 361/504 |
| 6,349,028 B1 | * | 2/2002 | Komatsu .................... 361/504 |
| 6,493,211 B1 | * | 12/2002 | Sugiyama et al. .......... 361/504 |

OTHER PUBLICATIONS

Shimizu, Izumi, Saito, Yamaoka, Ethylendiamine Tetraacetic Acid Modification of Crosslinked Chitosan Designed for a Novel Metal-Ion Adsorbent, Journal of Applied Polymer Science, vol. 92, 2758-2764, Wiley Periodicals, Inc. (US).

* cited by examiner

*Primary Examiner*—Nguyen T Ha
(74) *Attorney, Agent, or Firm*—Hensley Kim & Holzer, LLC

(57) ABSTRACT

An energy storage device comprises a pair of electrodes in contact with an electrolyte and a dielectric separator therebetween. The separator comprises a chelating material capable of binding parasitic to ions with the electrolyte, so to prevent the free circulation of the parasitic ions within the electrolyte. In one embodiment, the chelating material comprises chitosan, which may be provided in fibrous form and which may be included within a non-woven fabric of cellulosic and/or olefinic, or which may be instead coated on the separator or otherwise comprised in the separator. In another embodiment, the chelating material comprises chitosan, and the ion-binding capability of the chitosan is enhanced by chemically binding a chelating agent to the chitosan so to create a multidentate ligand that binds with the parasitic ions, particularly multi-valent metal ions, to create coordination compounds. One such chelating agent is ethylendiamine tetraacetic acid (EDTA).

14 Claims, No Drawings

ENERGY STORAGE DEVICE HAVING A SEPARATOR BLOCKING PARASITIC IONS

STATEMENT REGARDING FEDERALLY SPONSORED RESEARCH AND DEVELOPMENT

Not applicable.

REFERENCE TO A COMPUTER LISTING, A TABLE, OR A COMPUTER PROGRAM LISTING COMPACT DISK APPENDIX

Not applicable.

BACKGROUND OF THE INVENTION

1. Field of the Invention

The present invention concerns an energy storage device, and, more particularly, an energy storage device comprising a pair of electrodes in contact with an electrolyte and a dielectric separator therebetween, wherein parasitic metal ions emanating from the electrode active material and disposed within the electrolyte are substantially removed from the electrolyte by adding a chelating material to the separator.

2. Description of Related Art

Energy storage devices typically comprise one or more pairs of electrodes separated by a dielectric layer, wherein one electrode (called a cathode) within a pair is adapted to store a positive charge, while the other electrode (called an anode) is adapted to store a negative charge. An electrolyte (typically in liquid form) allows an ionic current to flow between the electrodes and through the separator, while the same separator prevents an electric current (as opposed to an ionic current) current from shorting the energy storage device.

In certain types of energy storage devices, the electrodes are produced from carbon powder that is prepared from by-products of natural materials such as coconut shells, rice hulls, peat and coal for cost reasons. These natural materials inherently contain high levels of metal contaminants, particularly multivalent metal impurities, that leach into the electrolyte when an electro-chemical potential is applied between the electrodes during the operation of the energy storage device. Once in the electrolyte, these multivalent metal ions have the propensity to undergo redox electrochemical reactions between the electrodes whenever the cell potential is greater than the half cell redox reactions of the multivalent metal ions. The multivalent metal ion redox reactions therefore reduce the time dependent charge storage stability of the energy storage device, causing the phenomenon otherwise known as leakage current.

For instance, in a capacitor operating in a voltage range from −1.5V to +2V, the applied voltage is sufficient to cause the metal ions within the electrolyte to act as parasitic charge carriers between the anode and the cathode electrodes as they undergo half cell charge transfer reactions. As a consequence, these impurities drain away electrons from the electrodes through their redox couple reactions by undergoing reductions or oxidation reactions at the electrodes that reduce the charged voltage potential of the capacitor.

One solution to the parasitic ion problem is using higher purity carbon materials, such as polymeric resins or hydrocarbons, to manufacture electrodes. However, this solution is impractical for cost reasons.

Another solution is subjecting the carbon particles to extensive washing and thermal treatments aimed at reducing the total metal impurity content. However, these impurities are mostly contained within the bulk of the natural starting material, and these washing and thermal treatments are suited only to remove those impurities present on or near the surface of the carbon particles. Due to the electro-chemical potential on the carbon particles during capacitor operation, the metal contaminants contained in bulk or in the deep pores of the carbon material that are not accessible to the purification treatments migrate by diffusion to the surface of the particle and enter the electrolyte, contributing to the problematic self-discharge and leakage currents experienced in energy storage devices in the prior art.

Therefore, there is a need for an energy storage device wherein the movement of parasitic ions within the electrolyte is substantially restrained.

BRIEF SUMMARY OF THE INVENTION

An energy storage device comprises a pair of electrodes in contact with an electrolyte and a dielectric separator therebetween. The separator comprises a chelating material capable of binding parasitic to ions with the electrolyte, so to prevent the free circulation of the parasitic ions within the electrolyte.

In one embodiment, the chelating material comprises chitosan, which may be provided in fibrous form and which may be included within a non-woven fabric of cellulose and/or olefinic fibers, or which may be instead coated on the separator or otherwise comprised in the separator.

In another embodiment, the chelating material comprises chitosan, and the ion-binding capability of the chitosan is enhanced by chemically binding a chelating agent to the chitosan so to create a multi-dentate ligand that binds with the parasitic ions, particularly multi-valent metal ions, to create coordination compounds. One such chelating agent is ethylendiamine tetraacetic acid (EDTA).

DETAILED DESCRIPTION OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

In an energy storage device, in order to move from one electrode device to the oppositely charged electrode, metal ions dispersed in the electrolyte must travel through the separator interposed between the electrodes. The present invention relates to inhibiting metal ion mobility by binding the ions to the separator, thereby isolating the ions from the driving force generated by the voltage potential between the electrodes.

"Chelation" is defined as the process of binding a ligand to a metal ion to form a metal complex. In one embodiment of the present invention, metal ions are immobilized by embedding a metal chelating material within the separator. As a consequence, the ions become bound to the separator upon contact with the metal chelating material and are prevented from moving inside the electrolyte. In one variant of this embodiment, the metal chelating material is embedded in the inner portion of the separator, so that the outer surfaces of the separator create a dielectric separation between the electrodes and the chelating material, reducing the possible decrease in metal ion binding capacity of the chelating material by contact with the electrode.

Several materials have shown to have metal chelation properties because these materials exhibit a binding affinity for a broad range of metal ions. Relevantly, chelating materials bind more efficiently to multi-valent ions (such as metal ions) and less efficiently to mono-valent ions (such as the electrolyte ions). Additionally, chelating materials can be tailored to have greater specificity towards one or more types of metal ions by tailoring the coordinating dentates of the material by means of process of a chemical synthesis.

One chelating material is chitosan, which is a poly(D-glucosamine). Chitosan is extracted from chitin, a material readily available in nature, as it can be found, among others, in the exoskeletons of crustaceans, such as shrimp and crabs. Chitin is essentially a polysaccharide composed of units of acetylglucosamine linked together in β-1,4 fashion, in the same fashion as the glucose groups that form cellulose, and has the following structure:

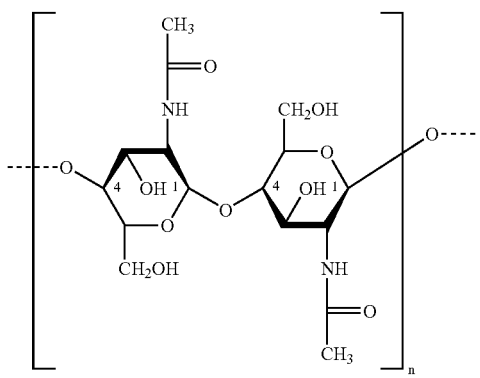

Chitosan is produced commercially by deacetylation of chitin and has the following formula:

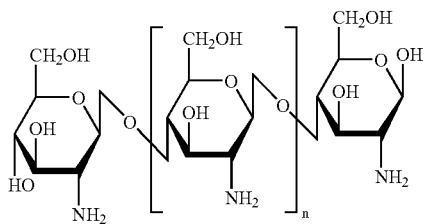

Chitosan can be wet spun into fibers, from which a non-woven fabric may be produced, made only of chitosan fibers alone, or of chitosan fibers in combination with other fibers such as cellulose and/or olefinic fibers. In a variant of this embodiment, the non-woven chitosan fabric is sandwiched between two layers of conventional paper separator, in order to create a metal ion-scavenging separator and at the same time prevent a direct contact between the chitosan and the electrode that would affect the ionic binding capacity of the chelating material.

In another variant of this embodiment, a single layer separator layer is provided that contains a blend of chitosan and non-chitosan fibers, such as cellulose and/or olefin fibers. In this variant, the chitosan fibers would be predominantly oriented in the direction of the negative electrode, as experiments have shown that there exists a greater interaction between the separator and the positive electrode, so that a direct interface between the chitosan material and the positive electrode would likely cause a reduction in the potential of the positive electrode.

One skilled in the art will recognize that other variants of the embodiment are possible that include different methods of adding chitosan to the separator; for instance, chitosan may be coated on, or interleaved with, the cellulose or olefinic separator, or at least a portion thereof.

In a second embodiment, a second chelating agent is chemically attached to the first chelating material, in order to enhance the capability of absorbing metal ions of the first chelating material. Preferably, such a chelating material is a tetra-dentate or hexa-dentate ligand, because multi-dentate ligands ordinarily react with metal ions in a single step process, whereas the complexation with unidentate ligands usually involves the production of two or more intermediate species.

One such combination involves the chemical combination of chitosan with the aminopolycarboxylic, ethylendiamine tetraacetic acid (EDTA) to create a hexa-dentate ligand. EDTA has the following chemical structure:

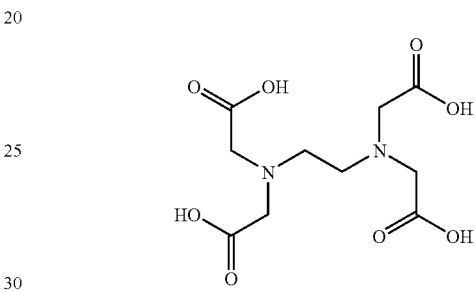

which contains six potential sites for complex formation, namely, the four carboxylic acid and the two tertiary amine groups. EDTA is capable of forming a coordination compound with metals by having the ligands of the EDTA wrap around the metal ions and effectively form a "cage" that provides a stable metal complex. Other metal complexing agents include compounds with amino, imino, hydroxy, thio-ether, carboxylate, and phosphonates multidentate groups. Examples of those other chelating compounds include crown ethers, ion exchange resins, other aminopolycarboxyics such as diethylene triamine pentaacetic acide (DTPA); hydroxy ethylene diamine triacetic acid (HEDTA); and nitrol triacetic acid (NTA).

As in the first embodiment, the chitosan-EDTA combination can be used to add a fibrous component to the separator between the electrodes, or to otherwise treat the separator in a manner that will effectively remove multivalent metal ions from the electrolyte.

While the invention has been described in connection with the above described embodiments, it is not intended to limit the scope of the invention to the particular forms set forth, but on the contrary, it is intended to cover such alternatives, modifications, and equivalents as may be included within the scope of the invention.

What is claimed is:

1. An energy storage device comprising:
    a first electrode capable of storing a positive electrical charge;
    a second electrode capable of storing a negative electrical charge;
    a separator disposed between the first and the second electrodes, the separator creating a dielectric layer between the first and the second electrodes; and an electrolyte contacting the first electrode, the second electrodes, and the separator and creating an ionic interface with the first and second electrodes, wherein the separator comprises fibrous form chitosan capable of binding parasitic ions contained in the electrolyte, thereby preventing the free circulation of the parasitic ions within the electrolyte.

2. The energy storage device of claim 1, wherein the parasitic ions comprise metal ions.

3. The energy storage device of claim 1, wherein the chitosan is derived from the deacetylation of chitin.

4. The energy storage device of claim 1, wherein the chitosan is comprised within a non-woven fabric.

5. The energy storage device of claim 4, wherein the non-woven fabric further comprises one or more fibrous materials selected from the group consisting of cellulose and olefin.

6. The energy storage device of claim 4, wherein the non-woven fabric is sandwiched between layers of paper.

7. The energy storage device of claim 1, wherein the chitosan is coated on at least a portion of the dielectric layer.

8. An energy storage device comprising:
a first electrode capable of storing a positive electrical charge;
a second electrode capable of storing a negative electrical charge;
a separator disposed between the first and the second electrodes, the separator creating a dielectric layer between the first and second electrodes; and
an electrolyte contacting the first electrode, the second electrodes, and the separator and creating an ionic interface with the first and second electrodes, wherein the separator comprises chitosan capable of binding parasitic ions contained in the electrolyte, thereby preventing the free circulation of the parasitic ions within the electrolyte, wherein the ion-binding capability of the chitosan is enhanced by chemically binding a chealating agent with the chitosan.

9. The energy storage device of claim 8, wherein the chelating agent operates as a multi-dentate ligand.

10. The energy storage device of claim 8, wherein the chelating agent is ethylendiamine tetraacetic acid (EDTA).

11. The energy storage device of claim 10, wherein the EDTA is functionalized to a dianhydride form.

12. The energy storage device of claim 10, wherein the EDTA is ester-modified and cross-linked with cellulose.

13. The energy storage device of claim 1, wherein the energy storage device is a capacitor.

14. The energy storage device of claim 8, wherein the energy storage device is a capacitor.

* * * * *